United States Patent [19]

Islam

[11] Patent Number: 5,078,464
[45] Date of Patent: Jan. 7, 1992

[54] OPTICAL LOGIC DEVICE

[75] Inventor: Mohammed N. Islam, Hazlet, N.J.

[73] Assignee: AT&T Bell Laboratories, Murray Hill, N.J.

[21] Appl. No.: 609,958

[22] Filed: Nov. 7, 1990

[51] Int. Cl.[5] .............. G02B 6/26; H03K 17/80; H04J 3/00; G02F 1/00

[52] U.S. Cl. .................. 385/122; 385/1; 385/38; 385/123; 385/27; 364/715.01; 307/407; 307/409; 359/135; 359/184; 359/188; 359/326

[58] Field of Search .............. 350/96.10, 96.15, 96.16, 350/96.29, 96.3; 364/713, 715.01, 712, 822, 900, 807; 307/407, 409, 425, 429, 430; 455/600, 610, 612; 370/3, 4

[56] References Cited

U.S. PATENT DOCUMENTS

| | | | |
|---|---|---|---|
| 4,558,921 | 12/1985 | Hasegawa et al. | 350/96.29 |
| 4,584,470 | 4/1986 | Iizuka et al. | 350/96.3 |
| 4,752,120 | 6/1988 | Shimizu | 350/96.13 X |
| 4,881,788 | 11/1989 | Doran | 350/96.29 X |
| 4,900,115 | 2/1990 | Heuring et al. | 350/96.15 |
| 4,913,507 | 4/1990 | Stamnitz et al. | 350/96.15 |
| 4,932,739 | 6/1990 | Islam | 350/96.15 |
| 4,962,987 | 10/1990 | Doran | 350/96.15 |
| 4,973,122 | 11/1990 | Cotter et al. | 350/96.15 |
| 5,020,050 | 5/1991 | Islam | 370/4 |
| 5,024,499 | 6/1991 | Falk | 350/96.11 |

*Primary Examiner*—Brian Healy
*Attorney, Agent, or Firm*—Gregory C. Ranieri

[57] ABSTRACT

An optical logic device based on the time-shift-keying architecture is described in which digital logic functions are realized by applying appropriate signal pulses to a nonlinear shift or "chirp" element whose output is supplied to a dispersive element capable of supporting soliton propagation. In an optical fiber realization of the optical logic device, two orthogonally polarized pulses are supplied to the combination of a moderately birefringent fiber acting as the nonlinear chirp element and a polarization maintaining fiber acting as the soliton dispersive delay element having a anomolous group velocity dispersion at the signal wavelengths of interest. A nonlinear frequency shift is created in one of the pulses in the former element through cross-phase modulation and, in turn, the frequency shift is translated into a temporal shift of the affected pulse in the latter element. These devices operate at switching energies approaching 1pJ.

11 Claims, 2 Drawing Sheets

OPTICAL LOGIC DEVICE

TECHNICAL FIELD

This invention relates to combinatorial logic gate devices and, more particularly, to optical devices realizing combinatorial logic functions.

BACKGROUND OF THE INVENTION

Optical computing is recognized as an emerging technology. Its continued maturation depends heavily on the availability of a wide range of logic devices and, more specifically, optical devices performing combinatorial logic functions. While the range of combinatorial logic functions such as AND, OR and NOT is important in the first instance, it is almost equally important to provide cascadability, logic level restoration, phase insensitivity, speed and input/output isolation. An additional consideration, though not presently decided upon, may be a need for an all-optical device.

All-optical, cascadable soliton logic devices have recently been demonstrated in birefringent optical fiber to provide several picojoule switching energy and a fan-out of six. See, for example, *Opt. Lett.*, Vol. 15, pp. 417 et seq. (1990). Logic outputs for this family of logic devices are presented according to a time-shift-keying criterion. That is, a logical "1" corresponds to the occurrence of a control pulse within a desired time slot or sampling interval, whereas a logical "0" corresponds to the substantial absence of the pulse during the desired time slot or sampling interval. Logic operations are performed by slowing or "time-shifting" the control pulse through interactions with a signal pulse within the birefringent optical fiber. The interactions produce a soliton dragging effect.

SUMMARY OF THE INVENTION

Reduction in size, greater flexibility in realization, and lower switching energies are achieved in an optical logic device based on a distributed time-shift-keying architecture in which digital logic functions are realized by applying appropriate signal pulses to a nonlinear frequency shift or "chirp" element whose output is supplied to a dispersive element capable of supporting soliton propagation. In an optical fiber realization of the optical logic device, two orthogonally polarized pulses are supplied to the combination of a moderately birefringent fiber acting as the nonlinear chirp element and a polarization maintaining fiber acting as the soliton dispersive element having an anomalous group velocity dispersion at the signal wavelengths of interest. A nonlinear frequency shift is created in one of the pulses in the former element through cross-phase modulation and that shift is translated into a temporal shift of the affected pulse in the latter element.

Cascadability, signal level restoration, speed, phase insensitivity and real time operation are achieved in the present all-optical combinatorial logic device. Extremely high contrast between on and off states is afforded because the device employs a novel architecture in which the output state of the logic device is determined by the presence or absence of a resultant signal during a prescribed time slot.

Optical logic devices realized in accordance with the principles of this invention accept one or more input data signals and control signal during a particular time slot. The time slot, as is discussed below, is generally related to a characteristic of the data signal and control signal pulse width such as the full width half maximum (FWHM). In general, when one or more of the data signals occurs during the same time slot as the control signal, the combinatorial logic device through the interaction between the data signals and the control signal causes the control signal to be moved to a neighboring time slot which may or may not be directly adjacent to the original time slot. That is, the control signal is effectively removed from the time slot in which it originally occurred. The logical output state of the combinatorial logic device is then determined by observing the presence or absence of the control signal during the original time slot at the device output.

By utilizing a distributed architecture, that is, by employing two functionally different elements in a serially connected relationship, it is possible to eliminate the need for solitons in a significant portion of the device and, thereby, realize the device at least partially with a wide range of standard dielectric waveguide materials. These devices operate at switching energies approaching 1pJ.

BRIEF DESCRIPTION OF THE DRAWING

A more complete understanding of the invention may be obtained by reading the following description of a specific illustrative embodiment of the invention in conjunction with the appended drawing in which.

DETAILED DESCRIPTION

Commonly accepted teachings for all-optical switches state that a $\pi$-phase shift should be achieved through the interaction between two copropagating pulses in waveguide over a distance less than one absorption length. See, for example, an article by A. Lattes et al. appearing in *IEEE J. Quantum Elec.*, Vol. QE-19, pp. 1718 et seq. (1983). For the present device architecture based on time-shift-keying and shown in FIG. 1, the former restriction on achieving a $\pi$-phase shift has been able to be relaxed significantly.

Optical logic devices realized in accordance with the principles of this invention are cascadable with a controllably large amount of fanout and provide gain. These devices accept one or more input data signals and an control signal during a particular time slot. The time slot or window, as is discussed below, is generally related to a characteristic of the data signal and control signal pulse width such as the full width half maximum (FWHM). In general, when one or more of the data signals occur during the same time slot as the control signal, the combinatorial logic device through interaction between the data signals and the control signal causes the control signal to be moved to a neighboring time slot which may or may not be directly adjacent to the original time slot. That is, the control signal is effectively removed from the time slot in which it originally occurred. The logical output state of the optical logic device is then determined by observing the presence or absence of the control signal during the original time slot.

Gain is afforded in this device structure by employing control signals which are much larger than the corresponding-data signals. Gain results from having a relatively low level signal control a much larger signal. As a result of the device gain, devices are cascadable without a need for signal amplification between cascaded devices. Moreover, because each device generates a high level output signal corresponding to the level of the control signal and further because input data signals are at a relatively low level, it is possible to divide the device output signal into a plurality of signals which are supplied to subsequent combinatorial logic devices. Division of an output signal in this manner is commonly called fanout.

Figure 1:
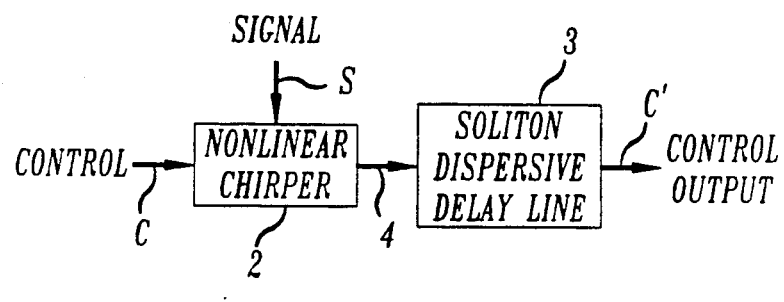
FIG. 1 shows a simplified block diagram of an optical logic device realized in accordance with the principles of the invention.
Figure 2:
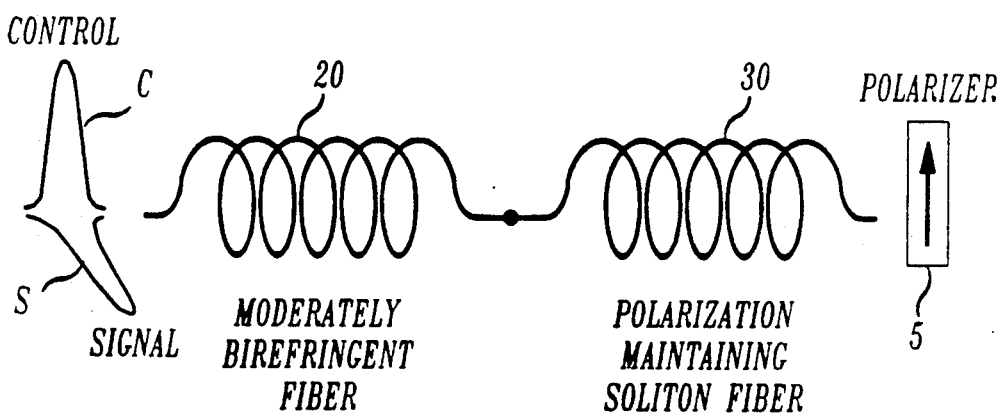
FIGS. 2 and 3 are simplified schematic diagrams of an exemplary embodiment of the device shown in FIG. 1.
Figure 3:
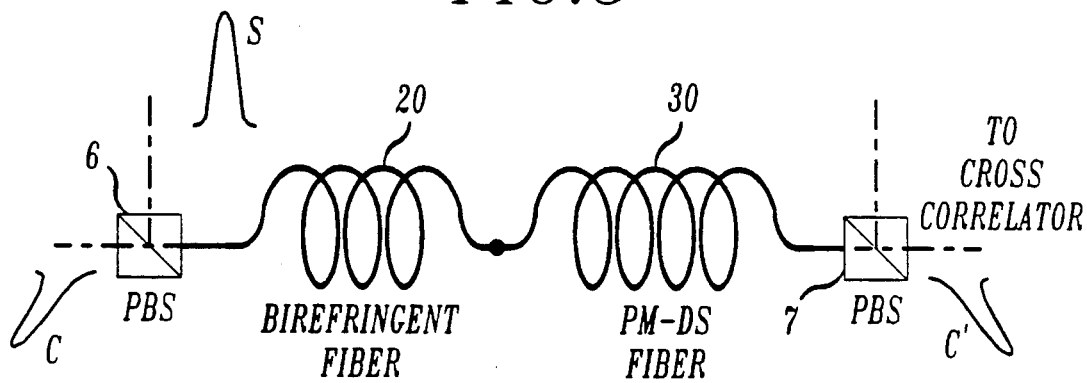

Examples of an optical logic device operating on optical signals in accordance with the principles of the invention set forth above are shown in simplified form in FIGS. 1, 2 and 3. The optical signals employed in at least a portion of each of these devices comprise pulses commonly known as solitons. At the present time, soliton-based systems appear to be the most desirable candidate system for incorporating combinatorial logic devices of the type presented herein. In order to gain a better understanding of the devices shown in the figures, a brief overview of solitons is presented below.

Fourier transform limited optical pulses propagating through an optical fiber experience pulse spreading due to a variation of group velocity called group velocity dispersion. Group velocity dispersion results from a linear dependence of the index of refraction on spectral frequency. That is, different spectral portions of an optical pulse travel at a different group velocity which, in turns, leads to a temporal broadening of the propagating optical pulse. Additionally, the fiber has a third-order nonlinear effect (self-phase modulation) in which its refractive index, n, depends on the light intensity, I, through the formula, $n = n_0 + n_2 I$, where $n_0$ is the linear refractive index and $n_2$ is the nonlinear refractive index. Balancing the negative group velocity dispersion with this nonlinear, intensity dependent effect gives rise to the formation of a soliton in the fiber. An input optical field of the form given by $u = (1+a) \text{sech}(t)$ contains a fundamental soliton when the amplitude, a, lies in the range of $-\frac{1}{2} < a < \frac{1}{2}$. Furthermore, the peak power, $P_1$, of an optical pulse with pulse duration, $\tau$, required to generate a single soliton in a single-mode fiber with effective-mode field area $A_{\textit{eff}}$ is given by $$P_1 = \frac{\lambda A_{\textit{eff}}}{4 n_2 Z_0}, \tag{1}$$

$$Z_0 = \frac{0.322 \pi^2 c \tau^2}{\lambda^2 |D|}, \tag{2}$$

where $P_1$ is the fundamental soliton power, $Z_0$ is the soliton period, and D is the dispersion in psec/nm.km. For a more detailed explanation of solitons, see Hasegawa et al., *Appl. Phys. Lett.*, Vol. 23, No. 3, pp. 142-44, (1973).

While solitons are nonlinear optical pulses that propagate in the anomalous group velocity dispersion regime (D>0) of the fiber without dispersing, solitons having different polarization states can still travel at a different group velocity ("walk-off") due to the birefringence of the fiber. Birefringence is that property of a material which cause two different polarization states to propagate at different velocities because the material has an ordinary and extraordinary index of refraction, i.e., a different refractive index for each polarization state.

Recently, it has been shown in principle that orthogonally polarized solitons of substantially equivalent amplitudes can trap one another and travel as a unit because of an intensity dependent effect that compensates for the birefringence. See C. R. Menyuk, *Optics Letter*, Vol. 12, No. 8 pp. 614–6 (1987) and C. R. Menyuk, *J. Opt. Soc. Am. B.*, Vol. 5, No. 2 pp. 392–402 (1988). Specifically, two equivalent level soliton pulses are caused to shift their center spectral frequency in opposite directions such that, through group velocity dispersion, the soliton pulse traveling along the fast axis slows down while the soliton pulse traveling along the slow axis speeds up. As the group velocity of each soliton pulse reaches equilibrium, the soliton pulses travel as an unit. Additionally, the trapped soliton pair appears at the output of the fiber at a time, $t + \Delta t$, where t is the time at which a single soliton would have appeared at the output.

When the orthogonal soliton pulses are of vastly different amplitudes, the trapping effect is insignificant and the time delay or "dragging" effect is accentuated as viewed from the larger soliton pulse. The soliton dragging effect is affected by the overlap in time of the orthogonal pulses and their relative amplitudes. It has been determined in general that, when the smaller pulse overlaps the larger pulse within approximately one soliton pulse width of the center of the larger pulse, soliton dragging occurs. The overlap may be decreased, that is, the pulses may be separated farther, for pulses of somewhat more comparable amplitude. For pulses having significantly different amplitudes, it is necessary to follow the rule of thumb given previously. It has been determined that the data signal pulses need not be capable of forming solitons but that they rather possess sufficient intensity to permit cross-phase modulation effects with the control signal in response to time-varying index changes.

Soliton-based optical logic devices are realized using, at least in some part, a birefringent waveguide. Birefringent waveguides include elements such as birefringent optical fibers having a birefringence induced by strain, material composition, geometry, or the like, on the order of $10^{-5}$ are suitable for realizing the devices shown in the figures. Birefringence is measured as the refractive index difference between the ordinary and extraordinary axes or polarization directions. It is desirable, although not necessary, to supply the control signal in a polarization compatible with the fast axis of the birefringent waveguide or fiber whereas the data signals are generally supplied in the orthogonal polarization corresponding to the slow axis of the birefringent waveguide or fiber.

As shown in FIG. 1, an optical logic device 1 realized in accordance with the principles of this invention performs a NOR or NOT function. The NOR function is realized more dramatically when the device is modified as discussed below to accept more than one data signal as input. Optical logic device 1 comprises a nonlinear frequency shift inducing element 2 in combination with a dispersive element 3 for translating the frequency shift induced in the control signal into a time shift so that the control signal C is moved out, or substantially removed, from its related time slot when the data signal S is present. It is significant that device 1 is realized in a functionally distributed manner, that is, with two separate elements performing independent functions. The significance is that existing nonlinear materials such as semiconductors and organic materials can be employed in realizing element 2 whereas fibers supporting soliton propagation are used for element 3. Nonlinear frequency shift inducing element 2 includes a combining element such as polarization beam splitter 6 (FIG. 3) for combining the data signal with the control signal. As the number of data signals to optical logic device 1 increases, more combining elements are added according to well known methods to combine all the data signals with the control signal. As shown in FIG. 1, element 2 is referenced as a "nonlinear chirper whereas, for reasons to be discussed below, element 3 is referenced as a "soliton dispersive delay line." By convention, the presence of a soliton pulse in a predetermined time slot is taken as a logical "1" while the absence of a soliton pulse from the predetermined time slot is taken as a logical "0".

It is assumed that a signal such as a data signal or a control signal corresponds to a pulse with a guard band surrounding its time slot. Typically, the guard band may extend over ten pulse widths to substantially avoid interaction between adjacent pulses. Since a logical "1" corresponds to a pulse arriving within the clock window and a logical 0 corresponds to either the absence of a pulse from the clock window or a pulse timed improperly, the interaction between data signal and control signal pulses in optical logic device 1 must result in a time shift of the control signal into, or out of the window. To avoid errors, it is expected that systems employing this type of optical logic device periodically remove improperly timed pulses. Further, it is contemplated that correlating gates or the like will be used at interfaces between optics and electronics to convert the results of time-shift-keying into a sequence of corresponding energy contrasts.

Figure 4:
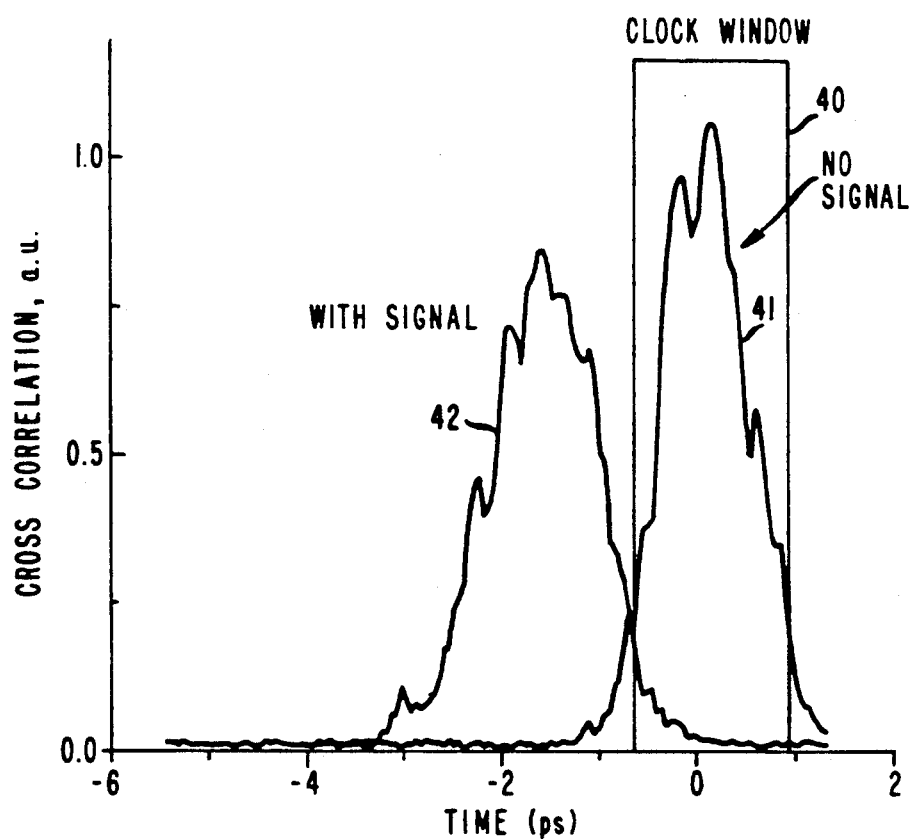
FIG. 4 shows cross-correlation plots of the output signal from the logic device both with and without input data signals present.

In operation, the optical logic device shown in FIGS. 1-3 accepts two orthogonally polarized inputs, namely, a data signal and a control signal. In the absence of a data signal, the control signal propagates directly through elements 2 and 3 and emerges as output signal C' squarely within the clock window. This phase of operation is depicted in FIG. 4 where control pulse 41 (signal C') is within the boundaries of clock window 40. When data signal S is input to element 2, it creates a time varying index change that chirps the control pulse and causes a shift of its center frequency. For a description of this effect, see *Optics Letters*, Vol. 12, p. 625 et seq. (1987). As the control pulse propagates through the soliton dispersive delay line, the induced frequency shift is translated into a corresponding time shift. Since the control pulse propagates as a soliton through element 3, a slight shift in the center frequency of the control signal causes the complete soliton to shift in time. Provided the time shift is sufficient to move the signal outside the clock window, good contrast can result within the clock window. This is demonstrated in FIG. 4 where signal 42 has been shifted outside clock window 40. The contrast is measured within the clock window by observing the difference in intensity between a logical 1 and a logical 0.

As presently understood, it is the nature of solitons which both permits the functional distribution to separate elements within device 1 and relaxes the $\pi$-phase shift limitation. This is better understood by substituting a simple linear dispersive delay line for soliton dispersive delay line 3. In this modified configuration, the frequency shift necessary to cause a change from a logical 1 to a logical 0 would be on the order of the entire spectral width of the signal. As a result, this modified configuration would still require a $\pi$-phase shift to occur in nonlinear chirper 2. In contrast, it is required that the data signal create only a slight shift in the center frequency of the control signal when solitons are employed for the control signal. This means that a phase shift much less than $\pi$ results after the interaction between the data signal and the control signal. Moreover, since interaction between the data signal and the control signal is unnecessary in element 3, element 3 can be fabricated from transparent material.

In the simplified illustration of an exemplary embodiment depicted in FIGS. 2 and 3, nonlinear chirping occurs through cross-phase modulation and walkoff of data signal S with control signal C in a moderately birefringent fiber 20. Moderately birefringent fiber 20 is connected to polarization maintaining soliton fiber 30 which acts as the dispersive delay line for translating the frequency shift induced in control signal C into a time shift for that signal. In an example from experimental practice, a passively modelocked color sensor laser supplies data and control signal pulses having a pulse width $\tau \approx 500$ fs at a wavelength substantially equal to 1.685 $\mu$m. The control and data signal pulses are combined via polarization beam splitter 6 substantially overlapped in time. From polarization beam splitter 6, the orthogonally polarized signals are coupled into moderately birefringent fiber 20 having a polarization dispersion $\Delta\beta'$ equal to 40 ps/km which corresponds to a birefringence $\Delta n$ of approximately $1.2 \times 10^{-5}$ and a length of approximately 25 meters corresponding to about two walkoff lengths where the walkoff length $l_{wo}$ is defined as $c\tau/\Delta n$. After the nonlinear frequency shift is induced on the control pulse propagating in fiber 20, the signals are coupled into a 600 m length of polarization maintaining, dispersion shifted optical fiber 30. Fiber 30 acts as soliton dispersive delay line 3 wherein the high birefringence of fiber 30 prevents interaction between the data and control signals. After propagating through fiber 30, the control pulse is coupled to the output of optical logic device 1 emerging as signal C'. In order to determine whether the output pulse falls within the clock window, it is desirable to combine a clock or reference signal (not shown), which corresponds to the window, with the control signal. This combining function is realized by polarization beam splitter 7. The output of polarization beam splitter 7 is sent to a cross-correlating gate for further processing.

The length of the fiber in element 3 is selected to be on the order of 10 or more soliton periods. This length is qualitatively determined to be the length necessary to obtain the complete time shift of the control signal corresponding to induced frequency shift of that signal.

The energy of signal S is determined to be that energy which causes sufficient chirp to shift the control signal. The energy of the control signal is determined by requiring the control signal to exist as a fundamental soliton in element 3. It has been determined that the switching energy for this type of device as realized in FIGS. 2 and 3 is proportional to $(\Delta T/\tau) \cdot \tau^2 \cdot \Delta n_1/(L_2 \cdot D_2)$, where $\tau$ is the pulse width, $\Delta n_1$ is the birefringence of fiber 20, and $L_2$ and $D_2$ are the respective length and group velocity dispersion in fiber 30.

Polarizer 5 shown in FIG. 2 and polarization beam splitter 7 shown in FIG. 3 also provide the important function of inhibiting further propagation of the data signals beyond the output of device 1. Both polarizer 5 and polarization beam splitter 7 pass only signal C' to the output of device 1.

For the example described above and plotted in FIG. 4, it is understood that the control signal has an energy of approximately 49 pJ whereas the data signal has an energy of approximately 5.6 pJ. The phase shift of control signal C induced through cross-phase modulation in fiber 20 has been determined to be approximately equal to $\pi/26$, which a very small fraction of $\pi$. It is understood that the phase and frequency shift can be further decreased by reducing the pulse width of the signal or by increasing the group velocity dispersion and/or length of the fiber.

The number of time slots through which the control pulse is shifted should be at least one and, preferably, two slots each of which corresponds to a signal pulse width. It should be noted that the generally accepted measure of pulse width is full width half maximum (FWHM). This shift may also be increased by lengthening the optical fiber. Since soliton systems are designed with a large number ($\approx 10$) of substantially vacant time slots around each soliton pulse, interference between dragged pulses and subsequent (non-dragged) pulses is substantially eliminated.

To avoid clock skew problems, it has been determined that fiber lengths should be accurately trimmed. For soliton pulses with a pulse width $\tau$ equal to 300 fs, fiber lengths are preferably corrected to an accuracy of $\tau(c/n)$ or approximately 60 $\mu$m.

Polarizer 5 is employed to extract the logic device output signal corresponding in polarization to the original control signal. This signal may be rotated to an orthogonal polarization by a standard polarization rotator (not shown) and fanned out by polarization beam splitters (not shown) for use as data signals in subsequent stages of logic devices. Polarizer 5 also serves to discard the data signals supplied on the orthogonal polarization to the control signal.

For fundamental soliton pulses, it is possible to achieve a maximum small signal gain of approximately 9 given that the fundamental soliton amplitude may take values between 0.5 and 1.5.

It is understood by those skilled in the art that multiple data signals may be input to element 2 of logic device 1. Several embodiments for combining a plurality of data signals are taught in U.S. patent application Ser. No. 420,972, now U.S. Pat. No. 4,932,739. The teachings of this application are expressly incorporated herein by reference.

It is understood by those skilled in the art that the NOR device realization shown in FIGS. 1 through 3 is sufficient for realizing all logic functions necessary for optical computing and other optical logic applications. For example, by supplying a logical "0" input for data signal B, it is possible to realize an inverter (NOT logic device). By cascading an inverters at the inputs with NOR logic device, it is possible to realize the AND logic operation.

I claim:

1. An optical logic device comprising
means responsive to at least a first data signal and a control signal for combining said control signal with said at least first data signal in a prescribed relationship, said control signal occurring in a prescribed time slot, said time slot substantially corresponding to a pulse width of said control signal,
means connected at an output of said combining means for inducing a nonlinear frequency shift of said control signal in response to said at least first data signal, and
means coupled to said frequency shift inducing means for supporting soliton propagation therethrough and for translating said nonlinear frequency shift into a corresponding time shift of said control signal so that said control signal is substantially removed from said prescribed time slot at an output of said device when said at least first data signal is present.

2. The optical logic device defined in claim 1 further comprising means coupled to an output of said translating means for inhibiting further propagation of said at least first data signal.

3. The optical logic device as defined in claim 1 wherein said nonlinear frequency shift inducing means includes a prescribed length of moderately birefringent optical fiber and wherein said translating means includes a prescribed length of polarization maintaining fiber exhibiting anomalous group velocity dispersion at a wavelength related to said control signal.

4. An optical logic device comprising
means responsive to at least a first data signal and a control signal for combining said control signal with said at least first data signal in a prescribed relationship, said control signal occurring in a prescribed time slot, said time slot substantially corresponding to a pulse width of said control signal,
means connected at an output of said combining means for inducing a nonlinear frequency shift of said control signal in response to said at least first data signal, and
means coupled to said frequency shift inducing means for supporting soliton propagation therethrough and for translating said nonlinear frequency shift into a corresponding time shift of said control signal so that said control signal is moved to a time slot neighboring said prescribed time slot at an output of said device when said at least first data signal is present. From said prescribed time slot at an output of said device when said at least first data signal is present.

5. The optical logic device defined in claim 4 further comprising means coupled to an output of said translating means for inhibiting further propagation of said at least first data signal.

6. The optical logic device as defined in claim 4 wherein said nonlinear frequency shift inducing means includes a prescribed length of moderately birefringent optical fiber and wherein said translating means includes a prescribed length of polarization maintaining fiber exhibiting anomalous group velocity dispersion at a wavelength related to said control signal.

7. An optical logic device comprising
means responsive to at least first and second data signals and a control signal for combining said control signal with said at least first and second data signals in a prescribed relationship, said control signal occurring in a prescribed time slot, said time slot substantially corresponding to a pulse width of said control signal,
means connected at an output of said combining means for inducing a nonlinear frequency shift of said control signal in response to said at least first data signal, and means coupled to said frequency shift inducing means for supporting soliton propagation therethrough and for translating said nonlinear frequency shift into a corresponding time shift of said control signal so that said control signal is substantially removed from said prescribed time slot at an output of said device when said first data signal is present or when said second data signal is present.

8. The optical logic device defined in claim 7 further comprising means coupled to an output of said translating means for inhibiting further propagation of said first and second data signals.

9. The optical logic device defined in claim 7 wherein at least said control signal is an optical signal having sufficient characteristics for achieving soliton propagation in said translating means, said first and second data signals having substantially equal amplitudes at a level less than an amplitude of said control signal, and said control signal being polarized orthogonal to both said first and said second data signals.

10. The optical logic device defined in claim 9 wherein said nonlinear frequency shift inducing means includes a prescribed length of moderately birefringent optical fiber and wherein said translating means includes a prescribed length of polarization maintaining fiber exhibiting anomalous group velocity dispersion at a wavelength related to said control signal.

11. The optical logic device defined in claim 10 wherein said control signal propagates along a fast axis of said birefringent optical fiber and wherein said first and second data signals propagate along a slow axis of said birefringent optical fiber, said first and second data signals being positioned in a predetermined temporal relationship to interact with said control signal via cross-phase modulation effects in said nonlinear frequency shift inducing means.

* * * * *